(12) United States Patent  
Fawcett et al.

(10) Patent No.: US 9,239,385 B2  
(45) Date of Patent: Jan. 19, 2016

(54) METHOD OF PRODUCING ISOTOPES IN POWER NUCLEAR REACTORS

(75) Inventors: Russell Morgan Fawcett, Atkinson, NC (US); Randy Peter Gonzales, Wilmington, NC (US); Russell Patrick Higgins, Wilmington, NC (US); Robert Bryant James, Wilmington, NC (US); Michael Thomas Kiernan, Wilmington, NC (US); William Earl Russell, II, Wilmington, NC (US); Steven Bruce Shelton, Wilmington, NC (US); David Grey Smith, Leland, NC (US); Russell Edward Stachowski, Wilmington, NC (US); Lukas Trosman, Wilmington, NC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 546 days.

(21) Appl. No.: 12/890,845

(22) Filed: Sep. 27, 2010

(65) Prior Publication Data

US 2015/0348663 A1 Dec. 3, 2015

Related U.S. Application Data

(62) Division of application No. 11/002,680, filed on Dec. 3, 2004, now Pat. No. 8,953,731.

(51) Int. Cl.
*G21C 1/00* (2006.01)
*G01S 13/93* (2006.01)
(Continued)

(52) U.S. Cl.
CPC ............. *G01S 13/9303* (2013.01); *G21C 1/303* (2013.01); *G21G 1/02* (2013.01)

(58) Field of Classification Search
CPC ....... G01S 13/9303; G21C 1/303; G21G 1/02
USPC .......... 376/156, 157, 158, 159, 172, 173, 202
See application file for complete search history.

(56) References Cited

U.S. PATENT DOCUMENTS 3,015,616 A   1/1962 Sturtz et al.
3,072,549 A * 1/1963 Compton et al. ............. 376/341

(Continued)

FOREIGN PATENT DOCUMENTS

| CA | 2 172 953 | 4/1995 | |
|----|-----------|--------|---|
| FR | 2647945 A1 | 12/1990 | |
| GB | 2065955 | 7/1981 | ............... G12G 1/02 |

OTHER PUBLICATIONS

Mirzadeh et al., "Production Capabilities in U.S. Nuclear Reactors for Medical Radioisotopes", Nov. 1992.*

(Continued)

*Primary Examiner* — Frank J McGue (74) *Attorney, Agent, or Firm* — Harness, Dickey & Pierce, P.L.C.

(57) ABSTRACT

In a method of producing isotopes in a light water power reactor, one or more targets within the reactor may be irradiated under a neutron flux to produce one or more isotopes. The targets may be assembled into one or more fuel bundles that are to be loaded in a core of the reactor at a given outage. Power operations in the reactor irradiate the fuel bundles so as to generate desired isotopes, such as one or more radioisotopes at a desired specific activity or stable isotopes at a desired concentration.

12 Claims, 4 Drawing Sheets

(51) Int. Cl.
*G21G 1/02* (2006.01)
*G21C 1/30* (2006.01)

(56) References Cited

U.S. PATENT DOCUMENTS

| | | | |
|---|---|---|---|
| 3,120,471 A * | 2/1964 | Duffield et al. | 376/404 |
| 3,158,546 A | 11/1964 | Cordova | 376/203 |
| 3,229,096 A | 1/1966 | Bonilla et al. | 250/507.1 |
| 3,269,915 A | 8/1966 | Ransohoff et al. | 376/170 |
| 3,282,655 A | 11/1966 | Case et al. | 423/4 |
| 3,324,540 A | 6/1967 | Lotts et al. | |
| 3,549,492 A * | 12/1970 | Ricci et al. | 376/344 |
| 3,594,275 A | 7/1971 | Ransohoff et al. | |
| 3,745,069 A | 7/1973 | Sofer et al. | |
| 3,955,093 A | 5/1976 | Quinby | 250/493.1 |
| 3,998,691 A | 12/1976 | Shikata et al. | |
| 4,196,047 A | 4/1980 | Mitchem et al. | |
| 4,284,472 A | 8/1981 | Pomares et al. | |
| 4,393,510 A | 7/1983 | Lang et al. | 376/172 |
| 4,462,956 A | 7/1984 | Boiron et al. | |
| 4,475,948 A | 10/1984 | Cawley et al. | |
| 4,493,813 A | 1/1985 | Loriot et al. | |
| 4,526,741 A | 7/1985 | Cawley et al. | |
| 4,532,102 A | 7/1985 | Cawley | |
| 4,597,936 A | 7/1986 | Kaae | |
| 4,617,985 A | 10/1986 | Triggs et al. | |
| 4,650,635 A | 3/1987 | Le Rat et al. | 376/250 |
| 4,663,111 A | 5/1987 | Kim et al. | |
| 4,729,903 A | 3/1988 | McGovern et al. | |
| 4,782,231 A | 11/1988 | Svoboda et al. | |
| 4,818,468 A | 4/1989 | Jungerman et al. | 376/195 |
| 4,859,431 A | 8/1989 | Ehrhardt | |
| 4,908,515 A | 3/1990 | McLeod | 250/507.1 |
| 5,009,837 A | 4/1991 | Nguyen et al. | 376/261 |
| 5,053,186 A | 10/1991 | Vanderheyden et al. | |
| 5,145,636 A | 9/1992 | Vanderhevden et al. | |
| 5,291,533 A | 3/1994 | Orr | 376/299 |
| 5,309,489 A | 5/1994 | Tate et al. | 376/299 |
| 5,347,550 A | 9/1994 | Tanabe et al. | 376/173 |
| 5,349,619 A | 9/1994 | Mochida et al. | 376/444 |
| 5,355,394 A | 10/1994 | Van Geel et al. | |
| 5,377,247 A | 12/1994 | Yoshioka et al. | 376/428 |
| 5,394,275 A | 2/1995 | Iketani et al. | 386/35 |
| 5,400,375 A | 3/1995 | Suzuki et al. | |
| 5,513,226 A | 4/1996 | Baxter et al. | |
| 5,596,611 A | 1/1997 | Ball | |
| 5,633,900 A | 5/1997 | Hassal | |
| 5,682,409 A | 10/1997 | Caine | |
| 5,758,254 A | 5/1998 | Kawamura et al. | |
| 5,867,546 A | 2/1999 | Hassal | |
| 5,871,708 A | 2/1999 | Park et al. | |
| 5,910,971 A | 6/1999 | Ponomarev-Stepnoy et al. | |
| 5,987,087 A | 11/1999 | Zhuikov et al. | 376/195 |
| 6,011,825 A | 1/2000 | Welch et al. | 376/195 |
| 6,056,929 A | 5/2000 | Hassal | |
| 6,160,862 A | 12/2000 | Wiencek et al. | |
| 6,233,299 B1 | 5/2001 | Wakabayashi | |
| 6,299,666 B1 | 10/2001 | Apostolidis et al. | 75/393 |
| 6,347,130 B1 | 2/2002 | Nylund | 376/433 |
| 6,456,680 B1 | 9/2002 | Abalin et al. | |
| 6,516,043 B1 | 2/2003 | Chaki et al. | 376/438 |
| 6,678,344 B2 * | 1/2004 | O'Leary et al. | 376/170 |
| 6,697,446 B2 * | 2/2004 | Kang et al. | 376/202 |
| 6,751,280 B2 | 6/2004 | Mirzadeh et al. | |
| 6,804,319 B1 | 10/2004 | Mirzadeh et al. | |
| 6,895,064 B2 | 5/2005 | Ritter | |
| 6,896,716 B1 | 5/2005 | Jones, Jr. | 75/396 |
| 7,139,360 B2 | 11/2006 | Lahoda | 376/419 |
| 7,157,061 B2 | 1/2007 | Meikrantz et al. | |
| 7,235,216 B2 | 6/2007 | Kiselev et al. | |
| 2002/0034275 A1 | 3/2002 | Abalin et al. | |
| 2003/0012325 A1 | 1/2003 | Kernert et al. | |
| 2003/0016775 A1 | 1/2003 | Jamriska, Sr. et al. | |
| 2003/0103896 A1 | 6/2003 | Smith | |
| 2003/0179844 A1 | 9/2003 | Filippone | 376/208 |
| 2004/0064010 A1 | 4/2004 | Wagner | 588/18 |
| 2004/0091421 A1 | 5/2004 | Aston et al. | |
| 2004/0105520 A1 * | 6/2004 | Carter | 376/268 |
| 2004/0196942 A1 | 10/2004 | Mirzadeh et al. | |
| 2004/0196943 A1 | 10/2004 | Di Caprio | |
| 2005/0105666 A1 | 5/2005 | Mirzadeh et al. | |
| 2005/0118098 A1 | 6/2005 | Vincent et al. | |
| 2006/0062342 A1 | 3/2006 | Gonzalez Lepera et al. | |
| 2006/0126774 A1 | 6/2006 | Kim et al. | |
| 2007/0133731 A1 | 6/2007 | Fawcett et al. | |
| 2007/0297554 A1 | 12/2007 | Lavie et al. | |
| 2008/0031811 A1 | 2/2008 | Ryu et al. | |
| 2008/0076957 A1 | 3/2008 | Adelman | |

OTHER PUBLICATIONS

Paas, A. and Sullivan, R., "Measurement of Neutron Activated Short-lived Nuclides using a Pneumatic Transfer System", 1962.*
Manual for reactor produced radioisotopes, Jan. 2003, IAEA, pp. i-45.*
Garland, M.A., "Medical Isotope Production in the Fast Flux Test Facility and the High Flux Isotope Reactor and Isotope Production Software Users Guides", Aug. 2000, DOE, pp. 1-72.*
Flanagan, G. F.; "Description of High Flux Isotope Reactor and Future Upgrades", specific date unknown, pp. 49-57 (evidentiary reference).*
Borschev et al., "Possibilities for producing radionuclides in nuclear power plants," Atomic Energy, vol. 95, No. 6, 2003 .
European Office Action dated Jul. 1, 2009.
Office Action for corresponding U.S. Appl. No. 11/002,680 dated May 11, 2011.
Office Action dated Apr. 4, 2012 issued in corresponding Canadian Application No. 2,527,682.
Japanese Notice of Allowance dated Sep. 25, 2012 for corresponding Japanese Application No. 2005-344804 (full translation provided).

* cited by examiner

METHOD OF PRODUCING ISOTOPES IN POWER NUCLEAR REACTORS

PRIORITY STATEMENT

This application is a divisional application of and claims priority under 35 U.S.C. §§120, 121 to co-pending application Ser. No. 11/002,680 "Method of producing isotopes in power nuclear reactors," filed Dec. 13, 2004, the entirety of which is incorporated by reference.

BACKGROUND

A wide variety of radioactive isotopes are used for medical, industrial, research, and commercial applications. In general, radioisotopes may be produced by irradiating target isotope materials with nuclear particles. The target atoms either transmute directly into the desired isotope, or a radioisotope is produced through a chain of absorption and decay that subsequently generates the desired radioactive product.

The latter is the case, for example, in the production of the important medical imaging isotope Technetium-99m, which represents about 90% of the isotopes used in today's nuclear medicine. Tc-99m produces high-energy gamma rays, which makes detection easy, and its short half-life of 6 hours minimizes the radiation dose delivered to the patient. Nuclear medical imaging is unique in its ability to analyze organ structure and functioning. It allows the gathering of diagnostic information that would otherwise require surgery, or not be available at all. It also promotes early detection and treatment of cancers and other problems.

Two different technologies are used to provide the source of radiation for radioisotope production: nuclear reactors, which produce a flux of neutrons, and particle accelerators or cyclotrons, which produce a flux of charged particles, usually protons, but sometimes electrons or other particles. As an example, Tc-99m is the decay daughter product of Mo-99, an isotope with a half-life of 66 hours that is produced in nuclear reactors as a fission product of the neutron bombardment of a uranium target material. This is the source of all of the Tc-99m used in the world today. After irradiation, Mo-99 is recovered from the target, and packed into a production device from which technetium may be eluted in substantially pure form as needed for preparing radiopharmaceuticals for nuclear medical procedures Other exemplary radioisotopes used for medical, industrial, research and commercial applications include thallium-201, which is used for medical cardiac imaging; calcium-44, which is used in bone growth studies; iridium-192, which is used for nondestructive testing of construction and other materials; cobalt-60, which is used to destroy cancer cells, to disinfect surgical equipment and medications, and the sterilization of food supplies; thulium-170, which is used for portable blood irradiations for leukemia, lymphoma treatment, and power source; gadolinium-153, which is used for osteoporosis detection and SPECT imaging; nickel-63, which can be used for the creation of long-life batteries; and americium-241, which is used in smoke detectors. In addition, rapid advances in nuclear medicine and other fields are focusing attention on a number of isotopes that have not previously been considered commercially important.

As an example of a conventional reactor used in radioisotope production, medical and industrial radioisotopes have been produced since 1957 by Canada's National Research Universal (NRU) reactor at the Atomic Energy of Canada's (AECL's) Chalk River Laboratories in Ontario, Canada. The NRU is a CANDU reactor designed for neutron beam research, materials research and medical/industrial isotope production. In general, CANDU plants are designed to use heavy water (deuterium oxide, or $D_2O$) as the moderator and coolant. The use of heavy water, combined with other features of its design, allows the CANDU reactor to use natural uranium (NU) fuel, which is relatively inexpensive and abundant worldwide.

The NRU produces a high percentage of the world's medical and industrial radioisotopes, including molybdenum-99, a critical isotope used for medical diagnoses. In general, specimen rods containing an isotope target are inserted through penetrations in the NRU in a continuous process and subject to irradiation therein, so as to produce isotopes at a desired specific activity for use in nuclear medicine and/or industrial applications.

Two specialty reactors, the MAPLE 1 and MAPLE 2, are under construction at Chalk River Laboratories. These reactors are intended to replace the NRU. The MAPLE 1 and MAPLE 2 are dedicated exclusively for the production of medical radioisotopes. These research reactors are not intended nor designed for commercial power generation, since they are being designed for power levels of about 10 $MW_t$. The MAPLE is a low-pressure, low-temperature, open-tank-in-pool type research reactor that uses low-enriched uranium (LEU) fuel. The core is compact, and is cooled and moderated by light water. Surrounding the light water core is a heavy water reflector tank, which maximizes the available neutron fluxes needed for radioisotope generation.

SUMMARY

Exemplary embodiments of the present invention, in general, may be directed to a method of producing isotopes in a light water power reactor, in which at least one or more targets within the reactor is irradiated under a neutron flux to produce at least one or more isotopes. The targets may be assembled into one or more fuel bundles that are to be loaded in a core of the reactor at a given outage. Power operations in the reactor irradiate the fuel bundles so as to generate desired isotopes, such as one or more radioisotopes at a desired specific activity or stable isotopes at a desired concentration.

BRIEF DESCRIPTION OF THE DRAWINGS

The present invention will become more apparent by describing, in detail, exemplary embodiments thereof with reference to the attached drawings, wherein like elements are represented by like reference numerals, which are given by way of illustration only and thus do not limit the exemplary embodiments of the present invention.

DETAILED DESCRIPTION

As to be described in further detail below, the exemplary embodiments may be directed to using power light water reactors designed for commercial power generation to produce medical and industrial isotopes, in addition to generating thermal and electrical power for residential, commercial and/or industrial use. Unlike research reactors dedicated only to the production of radioisotopes, these light water power reactors may be existing boiling water reactors (BWRs) and/or pressurized water reactors (PWRs) that are configured to generate at least 100 megawatts thermal ($MW_t$) and in example on the order of several hundred or thousand $MW_t$. These power LWRs generally have a bundle average enrichment of less than 10%.

Figure 1:
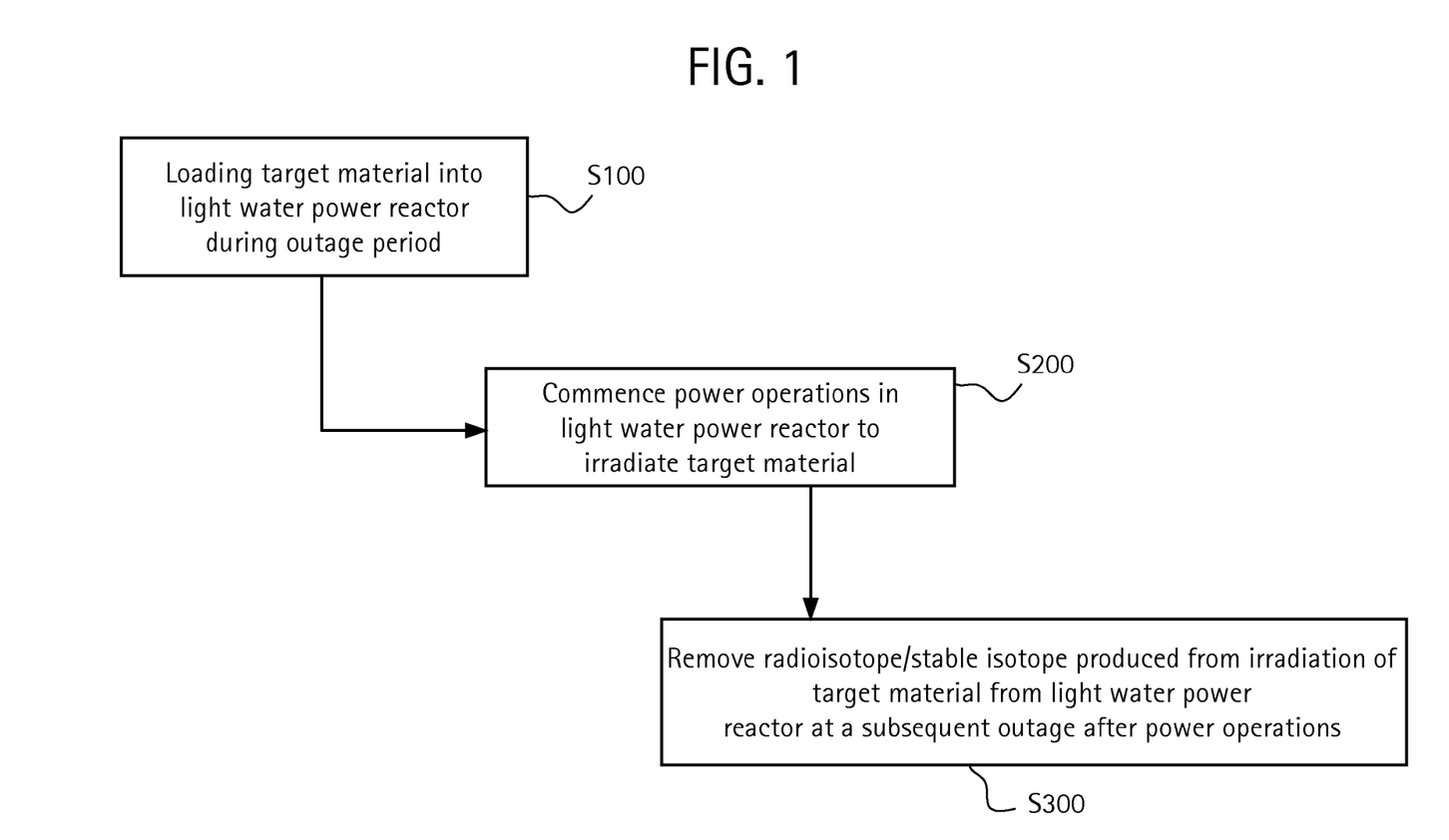
FIG. 1 is a flow chart illustrating a method of producing isotopes in a light water power reactor in accordance with an exemplary embodiment of the invention.

FIG. 1 is a flow chart illustrating a method of producing isotopes in a light water power reactor, in accordance with an exemplary embodiment of the invention. Referring to FIG. 1, isotope target material may be loaded into a light water power reactor during a planned outage period between power operations or even prior to initial reactor operation (S100). In an example, the targets may be loaded in one or more fuel bundles to be assembled in the reactor during the outage period. In a further example as will be seen in further detail below, the exemplary fuel bundle may be configured to include a plurality of one or more (or all) full length rods, one or more (or all) part length rods, one or more rods composed of a plurality of segments to realize a segmented rod, or combinations of one or more full length, part length and segmented rods. In another aspect, the isotope target may be housed within a containment structure that is inserted or placed within one or more given full length rods, part length rods, segmented rods or water rods of the fuel bundle so as to form or "target rods" for irradiation in the bundle of the reactor.

Once the fuel bundle(s) are assembled with one or more target rods, the fuel bundle(s), which may be occasionally referred to as "bulk isotope generation bundles (BIGs)" may be assembled in the core during the outage period. Thereafter, power operations for a next energy cycle in the reactor may be commenced to irradiate the target material therein (S200). The energy cycle represents a period of time (an exposure period as measured in megawatt-days per short time (MWD/st)) in which the reactor is operated for generating power between planned outages. Exemplary energy cycles for BWRs and/or PWRs may be 12 months, 18 months, 2 years, etc., for example.

During power operations, those fuel bundles containing targets are irradiated under a neutron flux in order to produce desired isotopes. The produced isotope may be understood as a radioisotope produced from the target isotope material at a desired specific activity, or a stable isotope that is produced from the target isotope material at a desired concentration, as the target absorbs one or more neutrons during the energy cycle.

The produced isotopes may be removed at a pre-planned outage at end of cycle (S300) so that isotope product removal coincides with the pre-planned outage, so as to minimize the impact on the expect energy production of the light water power reactor, for example. Accordingly, at end of cycle, the reactor may be shutdown and those bundles with produced isotopes (BIG bundles) may be removed or discharged from the reactor during the planned outage following shutdown.

Figure 2:
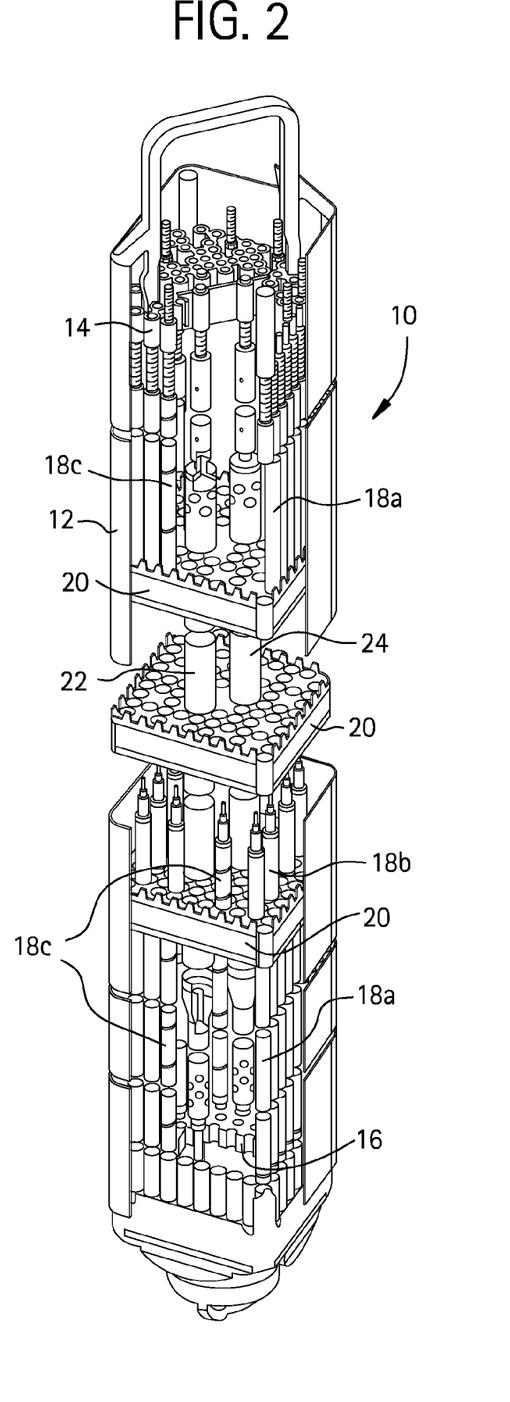
FIG. 2 illustrates an exemplary fuel bundle of a nuclear reactor in accordance with an exemplary embodiment of the present invention.

FIG. 2 illustrates an exemplary fuel bundle of a light water power reactor such as a boiling water reactor (BWR). Fuel bundle 10 may represent an exemplary BIG bundle for producing isotopes in a light water power reactor, it being understood that the exemplary embodiments are not limited to the exemplary fuel bundle configuration in FIG. 2. Fuel bundle 10 may include an outer channel 12 surrounding an upper tie plate 14 and a lower tie plate 16. A plurality of rods 18a-c may be disposed in a matrix within the fuel bundle 10 and pass through a plurality of spacers (also known as spacer grids) 20 vertically spaced one from the other maintaining the rods 18a-c in the given matrix thereof.

The rods 18a-c and at least a pair of water rods 22 and 24 may be maintained in spaced relation to each other in the fuel bundle 10 by a plurality of spacers 20 provided at different axial locations in the fuel bundle 10 so as to define passages for reactor coolant flow between the rods 18a-c in the fuel bundle 10. In FIG. 2, the matrix array of rods may be a 10×10 array, although the illustrative fuel bundle 10 may have a different matrix array of rods 18a-c, such as a 9×9 array. The bundle 10 may include all full length fuel rods 18a, all part-length rods 18b, all segmented rods 18c and/or any combination of full, part-length and/or segmented rods 18a-c; bundle 10 of FIG. 2 is shown including all configurations of rods 18a-c merely as an example. The water rods 22 and 24 (two are shown, there may be greater or fewer water rods in bundle 10) may be disposed among the rods 18a-c in bundle 10, between the lower tie plate 16 and the upper tie plate 14. The water rods 22, 24 serve to transfer moderator fluid from the lower regions of the nuclear fuel bundle 10 to the upper regions.

Figure 3:
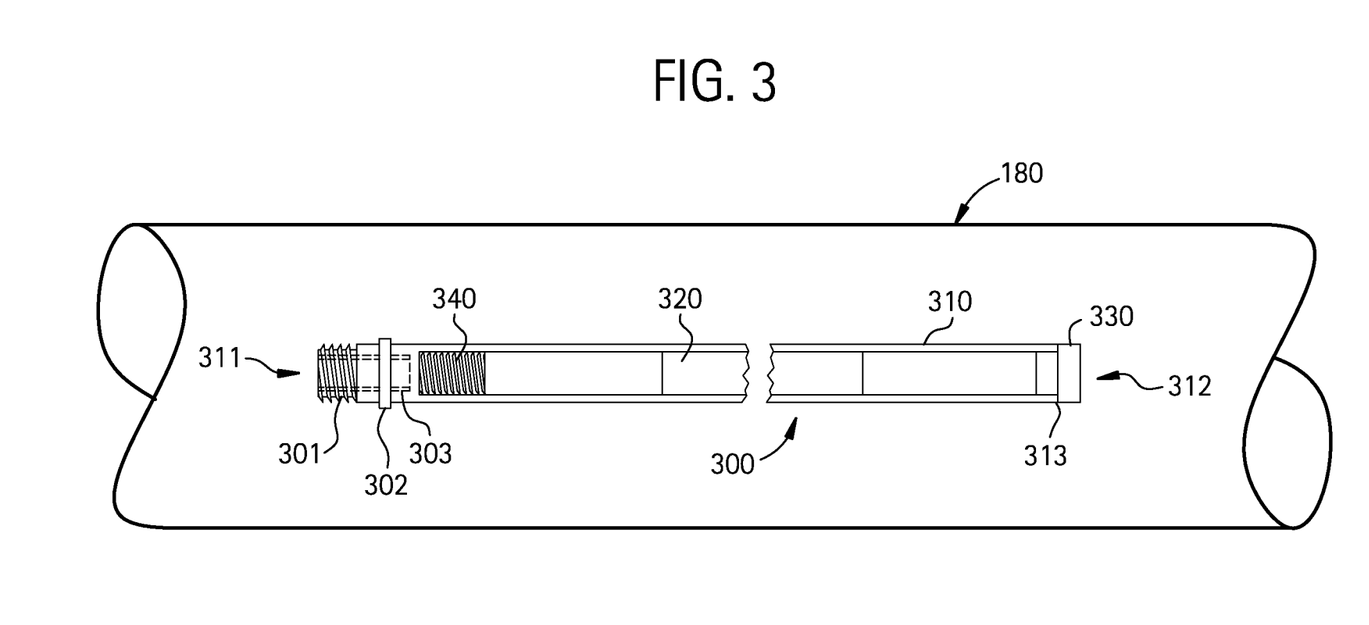
FIG. 3 illustrates a partial section of a tubing portion of a rod to illustrate a containment structure with target in accordance with an exemplary embodiment of the present invention.

FIG. 3 illustrates a tubing portion of a rod to illustrate a containment structure with target in accordance with an exemplary embodiment of the present invention. FIG. 3 shows a tubing portion 180 of an exemplary rod 18a-c of the fuel bundle 10, it being understood that this tubing portion 180 could be part of a full length rod 18a, part-length rod 18b and/or part of a segment of a segmented rod 18c.

In an exemplary embodiment of the present invention, various ones of the rods 18a-c may include a container assembly therein. FIG. 3 illustrates a tubing portion 180, which may be a section of one of the rods 18a-c, for example, or alternatively, part of an upper or lower end plug. The tubing potion 180 is shown in phantom (transparent) so as to illustrate a container assembly 300 and various features or components of the container assembly 300 provided therein in more detail. Container assembly 300 may include a containment structure 310 housing one or more irradiation targets 320 that produce one or more desired isotopes when a fuel bundle 10 containing one or more rods 18a-c with container assembly 300 is irradiated in the core of the light water power reactor. As desired above, a rod 18a-c with the container assembly 300 may be referred to as a target rod. One or more tubing portions 180 of a given target rod 18a-c may each include the same, different or multiple irradiation targets 320, for example.

Referring to FIG. 3, in one example the containment structure 310 may be substantially hollow, of a generally cylindrical shape and may be closed at one end 311, open at the other end 312 and may include a seal 313 to close the structure 310 by a suitable end cap 330, although end caps 330 may be provided at both ends. Although containment structure 310 is shown as having a generally cylindrical shape, containment structure 310 may be oriented in any geometrical shape so long as the largest diameter of the shape is less than the inner diameter of a tubing portion 180 of a given rod 18a-c. Containment structure 310 may be made of a suitable material such as a zirconium alloy, for example, although not limited to this material, it could also be a stainless steel or allow thereof.

Containment structure 310 may house one or more irradiation targets (i.e., isotope targets) 320 therein. Target 320 shown in FIG. 3 is illustrated in a generally solid, cylindrical form or shape. However, the irradiation target 320 may be embodied as a solid, liquid and/or gas. In another example, the target 320 may be in a 'BB' form or may assume a pellet-like shape that is comparable to the pellet size of existing UO$_2$ pellets, for example. Target 320 may take any geometry so long as the diameter of the geometry is small enough to fit inside the containment structure 310 (less than an inner diameter of the containment structure 310) within a given rod 18a-c. The containment structure 310 therefore provides a double containment for the isotope target 320 within the rod 18a-c when inserted therein at time of rod 18a-c manufacture.

Optionally, an interior of the containment structure 310 may include a spring 340 to provide a counter force against target 320 when sealed by end plug 330. The end plug 330 may be attached to the containment structure 310 by suitable attachment means, i.e., weld, threaded engagement, friction connection, etc. The containment structure 310 may include a pilot hole 303 at end 311 for removing the target(s) 320 after irradiation (which include isotope material therein). End 311 may include exterior threads 301 and an O-ring 302 that is used for sealing container assembly 300 when inserted into a piece of equipment. Pilot hole 303 may include interior threads to aid in the removal of container assembly 300 from a rod 18a-c. Further details of suitable container assemblies are described in the issued patent entitled "Rod Assembly for Nuclear Reactors", U.S. Pat. No. 7,526,058, the entire contents of which are incorporated by reference herein.

One or more tubing portions 180 of a given rod 18a-c may thus include container assemblies 300 with the same target 320, different targets or multiple targets that produce different isotopes at a desired specific activity (radioisotopes) and/or different stable isotopes at desired concentration, for example. In other words, a given target rod 18a-c can include a plurality of the same or different targets 320 spaced axially at different locations along the target rod 18a-c.

In one exemplary aspect of the invention, at least one target rod includes one or more container assemblies 300 but includes no nuclear fuel (i.e., "nuclear fuel" may be understood as desired enrichments of uranium of UO$_2$ pellets and/or gadolinium). In an aspect, the target 320 may be coated with a magnetic material to improve solubility and prevent release of target material therein into the reactor coolant.

In another aspect, one or more of the target rods 18a-c (full-length, part-length and/or segmented rods) may also include desired enrichments of uranium and/or gadolinium. A given fuel bundle 10 may include various combinations of rods 18a-c that include nuclear fuel, rods 18a-c that include no nuclear fuel but include targets 320, and rods 18a-c which have enriched uranium and/or gadolinium zoned at certain axial locations with targets 320 placed at other axial locations within the target rod 18a-c along the length thereof. The axial and/or radial locations and concentrations of fuel and poisons may be based on the desired characteristics of the bundle 10 for a planned energy cycle in the light water power reactor, for example. In an example, a rod segment of the segmented rod 18a-c that includes a container assembly 300 could also include nuclear fuel, although adjacent rod segments could include nuclear fuel therein.

The target 320 may be a target selected from a group of isotopes having an atomic number greater than 3. In an example, the target 320 may be selected from isotopes comprising one or more of cadmium, cobalt, iridium, molybdenum, nickel, thallium, and/or thulium isotope. Desirably, a given tubing portion 180 and/or container assembly 300 may include indicia or indicators thereon to indicate what target 320 is loaded therein, for example, and/or what isotope is to be produced from that target. As discussed above, the target 320 may be embodied in solid, liquid or gas form and placed inside a tubing portion 180 of a target rod 18a-c.

It may be desirable to place the target 320 in the reactor at a location that maximizes the specific activity of the produced radioisotope/concentration of the produced stable isotope at end of cycle. The properties of the target isotope and produced radioisotopes or stable isotopes may factor in this determination. Accordingly, the target 320 may be placed at a location in the reactor that may be determined as a function of the absorption cross-section of the target isotope itself, and also as a function of the half-life of the produced isotope and the absorption cross-section of the produced isotope. These factors influence the axial and radial zoning of target material within the fuel bundle and more specifically within individual target rods 18a-c of a BIG bundle such as the fuel bundle 10, for example. The absorption cross section of the containment structure 310 housing the target 320 may also be a factor. For some isotopes (such as IR-192), higher neutron fluxes are not necessarily desirable due to the fact that the target may prematurely burn out. By using a containment structure 310 with a material such as stainless steel instead of zircaloy, the desired reduced neutron flux on the target may be achieved, resulting in a high specific activity isotope at the end of cycle without premature burnout of the produced isotope.

The axial and radial locations within the core may be substantially strong independent variables that affect the amount and spectral characteristics of neutron flux that a target will observe. For example, if the absorption/decay characteristics indicate that a larger flux is desired to maximize specific activity, placement of the bundle away from the core boundaries (towards center of core) in both radial and axial directions may be desired. Similarly, if the absorption/decay characteristics indicate that a lower flux is desired to prevent burnout of the target isotope, then the target bundle should be placed towards the perimeter of the core and/or at the extreme top or bottom of the bundle.

Also, selection of the location of the target rod within a given target BIG bundle can greatly influence the final specific activity. As shown in the bundle 10 example of FIG. 2, rods located towards the perimeter and edge of the bundle in a BWR result in a greater thermal flux than the rods towards the inner regions of the bundle. Therefore based on the absorption/decay characteristics, appropriate rod locations may be selected.

Although the container assembly 300 with target 320 has been described as being located in a tubing portion 180 of a given rod 18a-c where there is no nuclear fuel, for some isotope targets it may be desirable to surround the container assembly 300 with additional enrichment. For example, a tubing portion 180 containing the containment structure 310 may be packed with additional enrichment in the area between the containment structure 310 outer surface and the inside of the tubing portion 180 during rod manufacture. By packing additional uranium in proximity to the target 320 within the containment structure 310, additional neutron flux may be obtained for the target 320. Consequently, the specific activity of the produced radioisotope may be higher and more valuable to the customer. In addition to adding enrichment, another factor which may affect the neutron fluxes surrounding the containment structure 310 may be the moderator. Packing a tubing portion 180 with additional or alternative moderator (such as graphite) in the space between the containment structure 310 and the inside of the tubing portion of a given rod 18a-c during rod manufacture may enable additional neutron flux to be obtained for the target 320 during power operations in the reactor. Done prior to reactor operation, providing additional moderator in closer proximity to a desired target location in the reactor may thus influence the energy spectrum of the neutron flux through the target during power operations.

Heretofore, the exemplary embodiments have been described loading an isotope target 320 within a containment structure 310 to be provided in one or more of the rods 18a-c of the exemplary bundle 10. However, depending upon the properties of the target isotopes and that of the produced radioisotope or stable isotope (i.e., absorption cross section, half life, etc.), it may be desirable to place the target in an axial location within the fuel bundle 10 that typically receives less neutron flux during an energy cycle. For example, each of rods 18a-c (and water rods 22, 24) include an upper end plug and a lower end plug that are connected to upper and lower end tie plate 14 and 16 in the bundle 10. One or more container assemblies 300 may be placed within interior portions of one of the upper or lower end plugs during the rod manufacturing process, for insertion into the fuel bundle 10 at a planned outage.

Alternatively, a containment structure housing one or more targets 320 therein may be placed within a control blade during a control blade manufacturing process. For example, a control blade which is used for reactor control between fuel bundles may have its neutron absorbers (i.e., $B_{4C}$, Hf, etc.) replaced with a container assembly 300. Such control blades would not be used for reactor control and could be used as radioisotope target vehicles into and out of the core. This may allow for insertion and removal of targets 320 at times other than reloads at a planned outage, for example. This may also provide flexibility in axial elevation selection for neutron flux tuning within the core.

A core of a light water power reactor includes several penetrations for insertion of instrumentation tubes during the energy cycle to take measurements, readings, etc. Accordingly, a containment structure 310 with radioisotope target 320 may be inserted into BWR instrumentation tubes through the use of a traversing and core probe machine, for example. This may also allow for insertion and removal of targets, to perhaps produce isotope material for those isotope having shorter half-lives or which do not need as much neutron flux to be removed at a time other than a planned reload at a planned outage.

In another alternative, isotope targets may be placed outside the core but within the pressure vessel. A typical light water power reactor such as a BWR includes a core shroud which connects the core to the reactor pressure vessel. A containment structure 310 with isotope target 320 therein may be attached to the core shroud during a planned outage and subsequently irradiated during a next energy cycle for irradiating the target 320 to produce a desired isotope therein. Placing the target 320 outside the core may facilitate licensing since it does not include core internals such as fuel, control blades, etc. Targets 320 which produce isotopes that require low flux may be desirable candidates for placing on the core shroud and may withstand an entire cycle of the radiation, for example.

Figure 4:
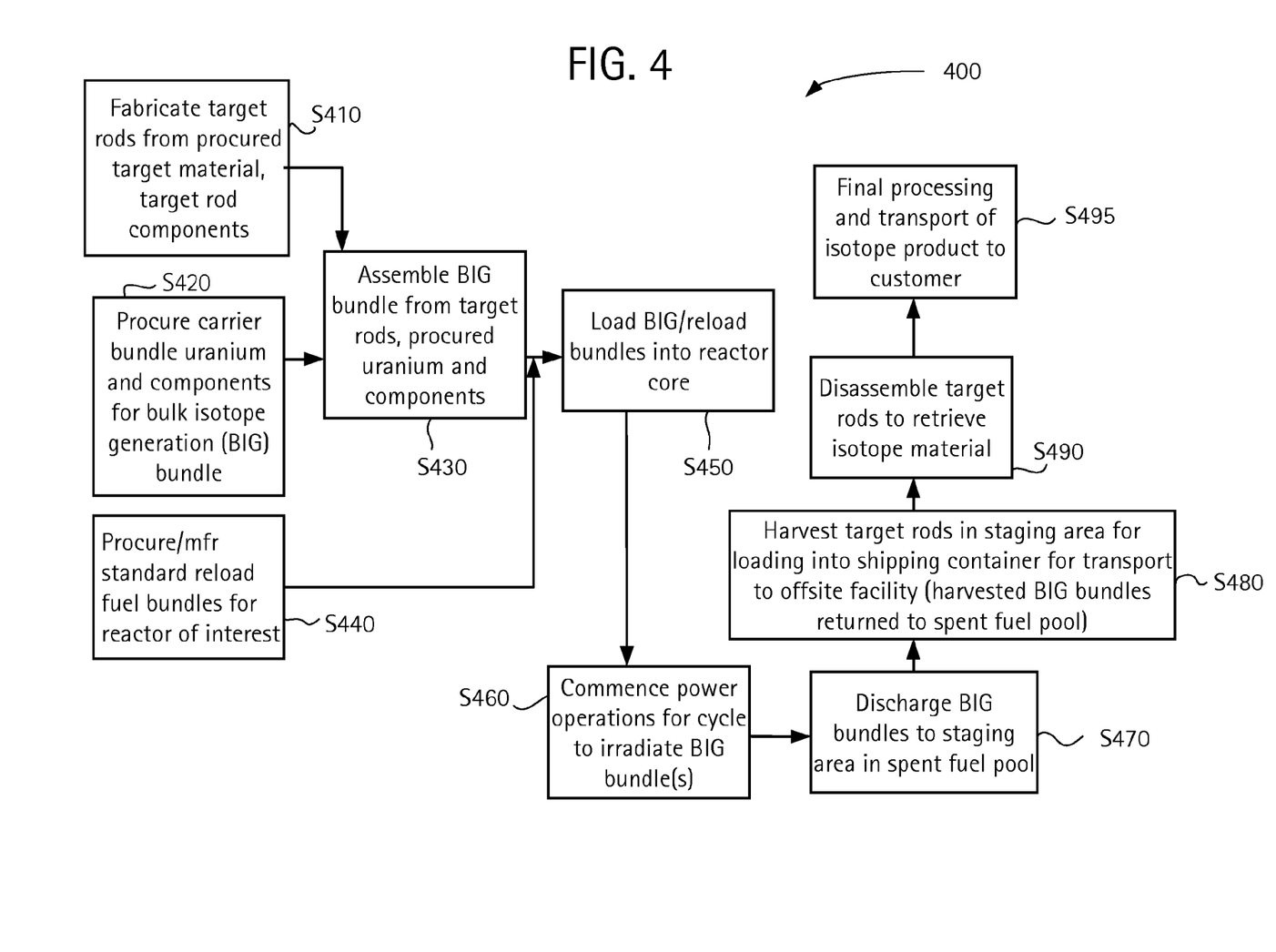
FIG. 4 is a flow chart illustrating a method of producing isotopes in target rods of a fuel bundle within a light water power reactor in accordance with an exemplary embodiment of the invention.

FIG. 4 is a flow chart illustrating a method of producing isotopes in target rods of a fuel bundle within a light water power reactor, in accordance with an exemplary embodiment of the invention. FIG. 4 illustrates an exemplary process 400 for producing isotopes in a LWR.

FIG. 4 illustrates exemplary process steps for assembling a bulk isotope generation bundle for insertion into the core of the light water power reactor during a planned outage, and also illustrates process steps for the removal of produced isotopes from the core and subsequent processing. The target rods 18a-c may be manufactured (S410) in advance. For example, desired isotope target materials, and target rod components may be procured in advance to manufacture target rods, which may be embodied as one or more of the rods 18a-c in FIG. 2. A given target rod may include a plurality of containment assemblies 300 inserted therein that include all of the same target, or include different targets located at desired axial locations in the rod to produce a radioisotope at a desired specific activity and/or desired stable isotope at a desired concentration, based on the properties of the target isotope material and/or known properties of the produced isotope.

Additionally, carrier bundle uranium and components for the bulk isotope generation bundle may be procured (S420) and the bulk isotope generation (BIG) may be assembled from the target rods, procured uranium and associated components (S430). Standard reload bundle procurement and manufacture of the reload bundles (S440) may also be performed, as is known, to be loaded at next planned outage. The reload bundles and BIG bundles may be shipped to the reactor site for loading into the core of a desired light water power reactor such as a BWR. Reload licensing for the reload bundles would be done prior to shipping or prior to loading the bundles in the core. The same is expected for the BIG bundles. The BIG and reload bundles are loaded into the reactor core (S450). Up on completion of the outage, the reactor may commence power operations for a given energy cycle to irradiate the BIG bundles (S460).

At end of cycle, the reactor is shut down and the BIG bundles may be discharged (S470) during the subsequent outage period to a staging area in the spent fuel pool. The staging area may be an enclosed work area or "safe chamber" within the spent fuel pool. The same chamber may be at a sufficient size to hold the BIG bundles and necessary tools, casks/shielded shipping containers and surveillance equipment. The safe chamber would allow for accidental dropping of target rods and prevent a potential radiation exposure accident and may provide a convenient way to secure and obtain quick access to surveillance equipment and disassembly tools.

In the staging area, the target rods may be harvested (S480) from the BIG bundle using suitable tooling and loaded into shielded shipping containers or casks for transport to an off-site facility. Those harvested BIG bundles are then returned to the spent fuel pool. Alternatively, if the plant site includes a hot cell facility, the hot cell facility may be joined to the reactor by a suitable corridor through which the materials irradiated in the reactor may be brought to the hot cells (shielded work areas) where the isotopes may be extracted and packaged for shipment. Thus, the target rods are disassembled (S490) in the hot cell to retrieve the desired isotope materials for final processing and transport (S495) to the customer.

Heretofore, the exemplary embodiments have been described in which the produced isotope is removed at a point in time to coincide with an end of cycle of a given energy cycle. However, there are occasions where an unplanned outage occurs at a point during the energy cycle, sometimes referred to as a mid-cycle outage. Accordingly, target isotopes may be loaded in the reactor that produce isotopes at a desired specific activity or stable isotope at a desired concentration at such a mid-cycle outage point. These radioisotopes or stable isotopes may then be removed at the mid-cycle outage point to provide a revenue stream that may potentially offset the costs associated with the unplanned outage period.

Accordingly, the exemplary methodology may illustrate the advantages of assembling bulk isotope generation bundles for a core of an existing light water power reactor that is designed for commercial power operations. A BIG bundle may include one or more target rods, and each target rod may include one or more of the same or different target isotopes that, upon irradiation under a neutron flux during an energy cycle, produce radioisotopes at a desired specific activity or stable isotopes at a desired concentration for medical and/or industrial isotope applications.

Since the core of the exemplary light water power reactor may include in upwards of several hundred fuel bundles, the potential to generate (bulk produce) medical and/or industrial isotopes to satisfy the world demand may be realized. As an example, a core loaded with no more than about 8 to 16 BIG bundles (out of a total of several hundred fuel bundles) could potentially produce sufficient isotope product to satisfy the current world demand for those applications that require medical and/or industrial isotopes.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed:

1. A method of producing isotopes in a light water power reactor, which includes an instrumentation tube, the method comprising:
    inserting an irradiation target into the instrumentation tube of the power reactor, the irradiation target being non-fissile, the instrumentation tube extending into the power reactor and enclosed within the power reactor and having an opening accessible from an exterior of the power reactor, the power reactor being a light water commercial power reactor for the commercial production of electrical power at levels of at least 100 megawatts thermal ($MW_t$); and
    irradiating the irradiation target in the instrumentation tube with neutron flux generated by the power reactor to produce a desired isotope; and wherein
    the inserting includes positioning the irradiation target in the power reactor based on the half-life of the radioactive isotope to be produced by irradiating the irradiation target, the duration of the irradiating, the neutron absorption rate of the irradiation target, and a level of neutron flux in the instrumentation tube.

2. The method of claim 1, further comprising:
    sealing the irradiation target in a containment structure, the inserting including inserting the containment structure containing the irradiation target into the instrumentation tube of the power reactor.

3. The method of claim 2, wherein the sealing includes sealing a plurality of irradiation targets in the containment structure, and wherein the irradiating includes irradiating the plurality of irradiation targets in the instrumentation tube with neutron flux generated by the power reactor to produce a plurality of desired isotopes.

4. The method of claim 2, wherein the containment structure does not substantially absorb the neutron flux such that nuclear properties of the containment structure do not substantially change during the irradiation.

5. The method of claim 2, further comprising:
    selecting a material of the containment structure based on an absorption cross-section of the material in the neutron flux, a level of the neutron flux, and an absorption cross-section of the irradiation target in the neutron flux.

6. The method of claim 2, wherein the sealing includes biasing a spring in the containment structure against the irradiation target.

7. The method of claim 1, wherein the desired isotope is one of a radioisotope having a desired specific activity and a stable isotope having a desired concentration.

8. The method of claim 1, further comprising:
    removing the produced isotope from the instrumentation tube after the irradiating.

9. The method of claim 8, wherein the removing occurs while the power nuclear reactor is in operation producing at least 100 Megawatts thermal power.

10. The method of claim 1, wherein the irradiation target includes one or more of cadmium, cobalt, iridium, nickel, thallium, and thulium.

11. The method of claim 1, wherein the irradiation target is a liquid or a gas.

12. The method of claim 1, wherein the power reactor is one of a Boiling Water Reactor (BWR) or a Pressurized Water Reactor (PWR).

* * * * *